(12) United States Patent
Blangero et al.

(10) Patent No.: US 12,002,953 B2
(45) Date of Patent: Jun. 4, 2024

(54) POSITIVE ELECTRODE ACTIVE MATERIAL FOR A RECHARGEABLE LITHIUM-ION BATTERY

(71) Applicants: UMICORE, Brussels (BE); UMICORE KOREA LTD., Cheonan-si (KR)

(72) Inventors: Maxime Blangero, Cheonan-si (KR); Liang Zhu, Olen (BE); YuRi Lee, Cheonan-si (KR); Kris Driesen, Olen (BE)

(73) Assignees: UMICORE, Brussels (BE); UMICORE KOREA LTD., Cheonan-si (KR)

( * ) Notice: Subject to any disclaimer, the term of this patent is extended or adjusted under 35 U.S.C. 154(b) by 535 days.

(21) Appl. No.: 17/236,058

(22) Filed: Apr. 21, 2021

(65) Prior Publication Data

US 2021/0242461 A1    Aug. 5, 2021

Related U.S. Application Data

(63) Continuation-in-part of application No. PCT/EP2019/078860, filed on Oct. 23, 2019.

(30) Foreign Application Priority Data

Oct. 24, 2018    (EP) .................................. 18202213.7

(51) Int. Cl.
*H01M 4/525*    (2010.01)
*C01G 53/00*    (2006.01)
*H01M 4/505*    (2010.01)
*H01M 4/02*    (2006.01)
*H01M 10/0525*    (2010.01)

(52) U.S. Cl.
CPC ............ *H01M 4/525* (2013.01); *C01G 53/50* (2013.01); *H01M 4/505* (2013.01); *C01P 2002/52* (2013.01); *C01P 2004/84* (2013.01); *C01P 2006/40* (2013.01); *H01M 2004/028* (2013.01); *H01M 10/0525* (2013.01)

(58) Field of Classification Search
CPC ............................. H01M 4/525; H01M 4/505
See application file for complete search history.

(56) References Cited

U.S. PATENT DOCUMENTS

2013/0202966 A1    8/2013    Yu et al.
2016/0276664 A1*   9/2016    Gunji .................... H01M 50/44
(Continued)

FOREIGN PATENT DOCUMENTS

JP    2017154916 A    9/2017
JP    2018523899 A    8/2018

OTHER PUBLICATIONS

SA/EP; International Search Report and Written Opinion for International Patent Application No. PCT/EP2019/078860 dated Jan. 14, 2020, 8 pages.
(Continued)

*Primary Examiner* — Olatunji A Godo
(74) *Attorney, Agent, or Firm* — NK Patent Law

(57) ABSTRACT

The present invention relates to positive electrode active materials in rechargeable lithium-ion batteries having a difference in cobalt concentration between the center and the edge of particle.

7 Claims, 7 Drawing Sheets

(56) References Cited

U.S. PATENT DOCUMENTS

2017/0317344 A1  11/2017  Tan et al.
2018/0233740 A1   8/2018  You et al.

OTHER PUBLICATIONS

WIPO; International Preliminary Report on Patentability for International Patent Application No. PCT/EP2019/078860 dated Nov. 3, 2020, 10 pages.

Manthiram, A., et al., "A perspective on nickel-rich layered oxide cathodes for lithium-ion batteries", Energy Storage Materials, ELSEVIER, vol. 6, Jan. 2017, 15 pages.

Zhang, Yongheng, et al., "Facile synthesis of a novel structured Li[Ni0.66Co0.1Mn0.24]O2 cathode material with Improved cycle life and thermal stability via ion diffusion", Journal of Power Sources, ELSEVIER, vol. 327, Jul. 11, 2016, 6 pages.

USPTO; Non-Final Action for U.S. Appl. No. 17/287,148 dated Apr. 12, 2023, 11 pages.

\* cited by examiner

POSITIVE ELECTRODE ACTIVE MATERIAL FOR A RECHARGEABLE LITHIUM-ION BATTERY

CROSS-REFERENCE TO RELATED APPLICATIONS

This application is a continuation-in-part of International Patent Application No. PCT/EP2019/078860, filed on Oct. 23, 2019, which claims the benefit of European Patent Application No. 18202213.7, filed on Oct. 24, 2018.

TECHNICAL FIELD AND BACKGROUND

The present invention relates to positive electrode active materials in rechargeable lithium-ion batteries having a difference in cobalt concentration between the center and the edge of particle.

The growing demand for portable electronic devices and the promising development in the electric vehicle industry inevitably require the proper power source. Hitherto, a lithium-ion battery (LIB) is the best electricity supplier for the aforementioned needs due to its high energy and power density. Commercially available LIBs in portable electronic devices typically consist of a graphite-based negative electrode and lithium cobalt oxide (LCO) as the most popular positive electrode active material. However, despite its good performance reputation, LCO is facing some major limitations such as a low thermal stability and a recent skyrocketing price of cobalt (Co).

One of the attractive alternatives to lessen the dependency of LCO as a positive electrode active material is lithium nickel manganese cobalt oxide (NMC), which is derived from LCO itself. Adopting the structure of LCO, NMC compositions are generally written as LiM"$O_2$ where M"=$Ni_{1-x'-y'}Mn_{x'}Co_{y'}$. By the partial replacement of Co with nickel (Ni) and manganese (Mn), a good performance, lower price, as well as the possibility to reach a higher thermal stability can typically be achieved.

Among the many possible composition ratios of NMC, Ni-rich material is found to generate a higher reversible capacity comparing to others. For example, NMC811 (M'=$Ni_{0.8}Mn_{0.1}Co_{0.1}$) typically has around 30% more capacity than NMC111 (M'=$Ni_{1/3}Mn_{1/3}Co_{1/3}$).

In the framework of the present invention, a Ni-rich NMC compound or material is a LiM'$O_2$ positive electrode active material wherein the molar content of Ni is of at least 0.70 mol.

The Ni-rich approach also reduces the price of the material since Ni and Mn prices are relatively lower and steadier compared to Co. The drawbacks, however, also stem from the high Ni presence.

Ni-rich NMC compounds are not stable in an air atmosphere comprising carbon dioxide and moisture. Therefore, extra steps for processing are required, leading an increase of production cost. Furthermore, Manthiram, et al., in "Energy Storage Materials Journal", January 2017, p. 125-139, explain that particles of Ni-rich layered materials are degraded due to particle cracks created by a volume change during charge and discharge in a battery. This volume change tends to be more severe for a higher Ni content in the structure.

By comprehending the high concentration of Ni as the cause of instability, addition of an outer layer with a different composition emerged as an approach to safely apply high Ni materials as a positive electrode active material. Various methods and materials can be used to produce such a layer, for example conventional carbon coating, metal particle coating, and creation of a concentration gradient from the surface to the core of each individual particle. The outer layer—or the exterior shell—protects the core from the outside environment, while maintaining its structural integrity.

For example, US 2018/233740 (or US'740) discloses a positive electrode active material for a lithium secondary battery made from a precursor having core-shell structure comprising: a core composed of lithium transition metal oxides including nickel, manganese and cobalt; and a Co-based shell including transition metal oxides. In US'740, the positive electrode active material made retains the core-shell structure of the precursor. Said positive electrode active material has a NMC core and a Co-based shell composed of lithium transition metal oxides including cobalt.

The present invention aims at providing a Ni-rich NMC positive electrode active material (i.e. comprising at least 0.70 mol of Ni) having initial discharge capacity (DQ1) higher than 195 mAh/g and first cycle efficiency (EF) higher than 91%, which may be obtained from a low temperature conversion (e.g. at a temperature of less than 800° C.) of a Ni-rich NMC precursor.

SUMMARY

This objective is achieved by providing a positive electrode active material suitable for lithium-ion rechargeable batteries, wherein the positive electrode active material, comprises Li, M', and oxygen, wherein M' comprises:
- Ni in a content x between 70.0 mol % and 75.0 mol %, relative to M';
- Co in a content y between 0.1 mol % and 40.0 mol %, relative to M';
- Mn in a content z between 0.1 mol % and 70.0 mol %, relative to M',
- D in a content a between 0.0 mol % and 2.0 mol %, relative to M', wherein D comprises at least one element of the group consisting of: Al, B, Ba, Ca, Cr, Fe, Mg, Mo, Nb, S, Si, Sr, Ti, Y, V, W, Zn, and Zr, and,
- wherein x, y, z, and a contents are measured by ICP,
- wherein x+y+z+a is 100.0 mol %,
- wherein said positive electrode active material comprises secondary particles consisting of a plurality of primary particles,
- wherein the positive electrode active material has a Ni content $Ni_{edge}$ and Co content $Co_{edge}$ as measured by cross-sectional EDS (CS-EDS) at the edge of the secondary particle of the positive electrode active material, wherein Ni and Co content are expressed as molar fractions compared to the sum of Ni, Mn, and Co content as measured by CS-EDS at the edge of the secondary particle of the positive electrode active material,
- wherein the positive electrode active material has a Ni content $Ni_{center}$ and Co content $Co_{center}$ measured by CS-EDS at the center of the secondary particle of the positive electrode active material, wherein Ni and Co contents are expressed as molar fractions compared to the sum of Ni, Mn, and Co content as measured by CS-EDS at the center of the secondary particle of the positive electrode active material,
- wherein the ratio $Ni_{edge}/Ni_{center}<1.0$
- wherein the ratio $Co_{edge}/Co_{center}>1.0$
- wherein said secondary particles have an average crystallite size of at most 65 nm, as determined by XRD.

Typically, the positive electrode active material is on the form of a powder.

The first cycle efficiency of a positive electrode active material is an important parameter. The lower first cycle efficiency ($E_F$) value between a positive electrode active material and a negative electrode active material decides the specific capacity of a battery. The efficiency of the negative electrode active material is generally 92~94%, which is generally higher than that of most of NMC type positive electrode materials. Therefore, it is desirable that the first cycle efficiency ($E_F$) of a positive electrode material is more than 92%, preferable more than 94%. Advantageously, the positive electrode active material of the present invention typically has an increased first cycle efficiency ($E_F$) of greater than 92%.

Positive electrode active material with a higher efficiency and discharge capacity is greatly desired since capacity represents the amount of energy that can be extracted from the battery. The first discharge capacity of a positive electrode active material of the present invention is preferably higher than 196 mAh/g as obtained by the analytical method as described herein.

It is also observed that a positive electrode active material according to the present invention has a better heat resistance.

Differential scanning calorimetry (DSC) analysis is a good tool to evaluate the safety of positive electrode active materials. It is observed that the positive electrode active materials according to the present invention typically achieves the desired level of safety.

The present invention concerns the following embodiments:

Embodiment 1

In a first aspect, the present invention provides a positive electrode active material suitable for lithium-ion rechargeable batteries, wherein the positive electrode active material comprises Li, M', and oxygen, wherein M' comprises:
  Ni in a content x between 70.0 mol % and 75.0 mol %, relative to M';
  Co in a content y between 0.1 mol % and 40.0 mol %, relative to M';
  Mn in a content z between 0.1 mol % and 70.0 mol %, relative to M',
  D in a content a between 0.0 mol % and 2.0 mol %, relative to M', wherein D comprises at least one element of the group consisting of: Al, B, Ba, Ca, Cr, Fe, Mg, Mo, Nb, S, Si, Sr, Ti, Y, V, W, Zn, and Zr, and,
  wherein x, y, z, and a contents are measured by ICP,
  wherein x+y+z+a is 100.0 mol %,
  wherein said positive electrode active material comprises secondary particles consisting of a plurality of primary particles,
  wherein the positive electrode active material has a Ni content $Ni_{edge}$ and Co content $Co_{edge}$ as measured by cross-sectional EDS (CS-EDS) at the edge of the secondary particle of the positive electrode active material, wherein Ni and Co contents are expressed as molar fractions compared to the sum of Ni, Mn, and Co content as measured by CS-EDS at the edge of the secondary particle of the positive electrode active material,
  wherein the positive electrode active material has a Ni content $Ni_{center}$ and Co content $Co_{center}$ as measured by CS-EDS at the center of the secondary particle of the positive electrode active material, wherein Ni and Co contents are expressed as molar fractions compared to the sum of Ni, Mn, and Co content as measured by CS-EDS at the center of the secondary particle of the positive electrode active material,
  wherein the ratio $Ni_{edge}/Ni_{center}<1.0$
  wherein the ratio $Co_{edge}/Co_{center}>1.0$
  wherein said secondary particles have an average crystallite size of at most 65 nm, as determined by XRD.

Preferably, the $Ni_{edge}/Ni_{center}<0.95$ and $Co_{edge}/Co_{center}>1.05$.

In the framework of this invention, the external edge of the secondary particle of the positive electrode active material is the boundary or external limit distinguishing the secondary particle from its external environment. The molar fraction of an element in the center of a secondary particle is determined by EDS measurement of the cross-sectional sample at the center part of the secondary particle. The center part of the secondary particle is the center point of a longest axis in a secondary particle in the cross-section.

A secondary particle taken for the CS-EDS measurement typically has a diameter of D50±0.5 μm, as determined by particle size distribution analysis.

Preferably, the difference between $Ni_{edge}$ and $Ni_{center}$ is at least 5 mol % and a difference between $Co_{edge}$ and $Co_{center}$ is at least 5 mol %, thereby showing Ni and Co concentration gradient from the edge to the center of the secondary particle of the positive electrode active material.

Preferably, Mn molar fraction at the edge of the positive electrode active material compared to the sum of Ni, Mn, and Co measured by CS-EDS at the edge of the positive electrode active material is higher than 0 mol %.

Embodiment 2

In a second aspect, the present invention provides secondary particles of the positive electrode active material that typically have an average crystallite size of at least 15 nm, as determined by XRD. Preferably, the secondary particles of the positive electrode active material have an average crystallite size at most 65 nm, and more preferably at most 60 nm as determined by XRD.

Embodiment 3

In a third aspect, the present invention provides a battery comprising the positive electrode active material of the present invention.

Embodiment 4

In a fourth aspect, the present invention provides the use of a battery according to the present invention in a portable computer, a tablet, a mobile phone, an electrically powered vehicle, or an energy storage system.

DETAILED DESCRIPTION

Figure 1:
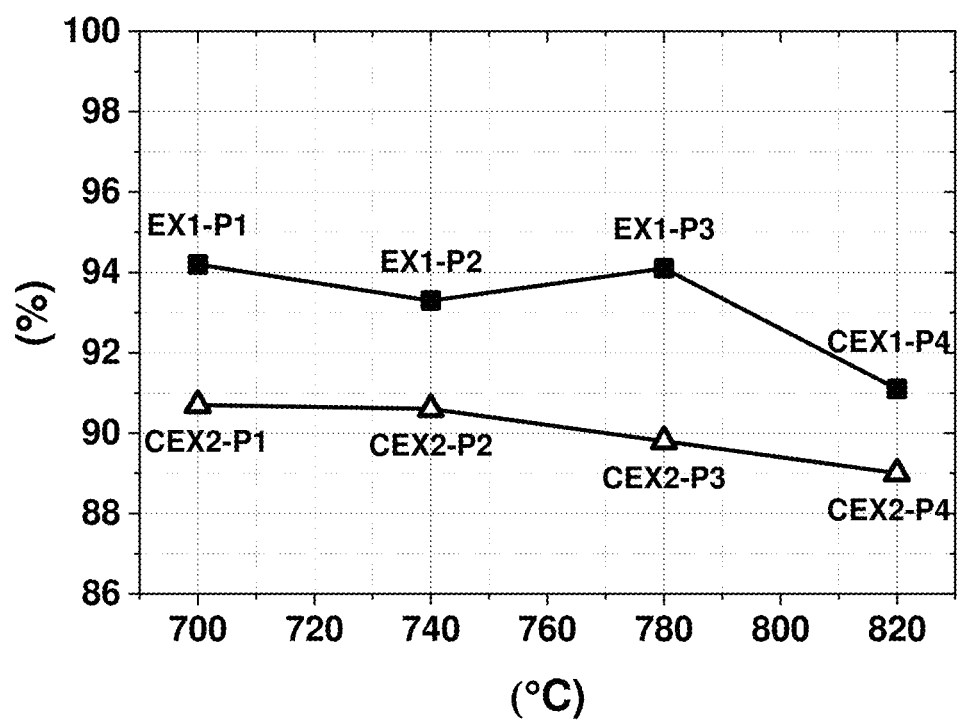
FIG. 1. Comparison of the first cycle efficiency ($E_F$) performance for examples of the present invention (EX1-P1, EX1-P2 and EX1-P3) and comparative examples (CEX1-P4, CEX2-P1, CEX2-P2, CEX2-P3 and CEX2-P4) prepared at different temperatures (x-axis: temperature in ° C., y-axis: first cycle efficiency ($E_F$) in %)

In the following detailed description, preferred embodiments are described in detail to enable practice of the present invention. Although the present invention is described with reference to these specific preferred embodiments, it will be understood that the present invention is not limited to these preferred embodiments. To the contrary, the present invention includes numerous alternatives, modifications and equivalents as will become apparent from consideration of the following detailed description.

Ni-rich NMC compounds according to the present invention typically have one or more of the following advantages of an improved first cycle efficiency ($E_F$), cycle stability and thermal stability which promote a higher level of safety. This is believed to be achieved by taking a synergetic advantage of the Ni and Co concentration gradient in the secondary particle of the positive electrode active material and also that the secondary particles of the have a low average crystallite size.

The above-mentioned positive electrode cathode material can be prepared by several different methods known in the art. For example, a method for manufacturing an active positive electrode material suitable for use in lithium-ion batteries may comprise the steps of:
  providing a precursor compound which may be in one aspect either one of a metal-bearing M'-hydroxide, -oxyhydroxide or -carbonate, with $M'=Ni_{1-x-y-z}Mn_xCo_yA_z$ with $x>0$, $y>0$, $0.70 \leq 1-x-y-z \leq 0.95$ and $0 \leq z<0.1$, the precursor comprising a core comprising a metal-bearing compound $M'_c$ and a shell comprising a metal-bearing compound $M'_s$, wherein $M'_c = Ni_{1-xc-yc-zc}Mn_{xc}Co_{yc}A_{zc}$ with $0<xc \leq 0.2$, $0<yc \leq 0.2$, $0 \leq zc<0.1$ and $0.75 \leq 1-x-y-z \leq 0.95$, and $M'_s = Ni_{1-xs-ys-zs}Mn_{xs}Co_{ys}A_{zs}$ with $0 \leq xs \leq 0.25$, $0.75<ys \leq 0.95$, $0 \leq zs<0.1$ and $0 \leq 1-xs-ys-zs \leq 0.10$,
  mixing the precursor compound with LiOH, and
  sintering the mixture at a temperature of greater than or equal to 680° C. and less than or equal to 800° C., preferably at a temperature of greater than or equal to 680° C. and less than or equal to 780° C.

In this example method, the precursor compound may be in another aspect either one of a metal-bearing M'-hydroxide, -oxyhydroxide or -carbonate, wherein $1-xs-ys-zs=0$; $0.05 \leq xs \leq 0.25$.

In this example method, the precursor compound may be in another aspect a M'-hydroxide or -oxyhydroxide, wherein $0<xs \leq 0.15$; $0.05 \leq xs \leq 0.15$.

In this example method, the precursor may be in another aspect a M'-hydroxide or -oxyhydroxide, wherein $0.05<xc<0.15$, $0.05<yc<0.15$, $zc=0$ and $0.75<1-x-y-z<0.85$, and wherein $0.05<xs<0.15$, $0.85<ys<0.95$ and $zs=0$.

In this example method, the precursor compound may have an average radius R, and the shell has an average thickness $T_S$, with $T_S$ being between 0.5 and 5% of R. Furthermore, in this example method A may be either one or more of Ti, Mg, W, Zr, Cr, V and Al for all aspects of the precursor compound described above.

In addition, in this example method the step of providing a precursor compound may comprise the sub-steps of:
  providing a first aqueous solution comprising $M'_cSO_4$, NaOH and $NH_3$, wherein the content of OH— ions is at least twice the content of $M'_c$ ions,
  precipitating $M'_c(OH)_2$ as a core material,
  providing a second aqueous solution comprising the precipitated $M'_c(OH)_2$, $M'_sSO_4$, NaOH and $NH_3$, thereby precipitating the precursor compound according to the invention comprising the $M'_c(OH)_2$ core material and a shell material comprising $M'_s$.

In this example method it could also be that the precipitated $M'_c(OH)_2$ is transferred to a second aqueous solution comprising $M'_sSO_4$, NaOH and $NH_3$, thereby precipitating a shell material comprising $M'_s$ on the $M'_c(OH)_2$ core material.

The following analysis methods are used in the Examples:

A) Particle Size Distribution (PSD) Analysis

The PSD is measured using a Malvern Mastersizer 3000 with Hydro MV wet dispersion accessory after dispersing the positive electrode active material powder in an aqueous medium. To improve the dispersion of the positive electrode active material powder, sufficient ultrasonic irradiation and stirring is applied, and an appropriate surfactant is introduced. D10, D50 and D90 are defined as the particle size at 10%, 50% and 90% of the cumulative volume % distribution. The span is defined as (D90–D10)/D50.

B) Inductively Coupled Plasma (ICP) Analysis

The composition of Ni-rich NMC compounds in this description is measured by the inductively coupled plasma (ICP) method using an Agillent ICP 720-ES. 1 g of a NMC compound powder sample is dissolved into 50 mL high purity hydrochloric acid in an Erlenmeyer flask. The flask is covered by a watch glass and heated on a hot plate at 380° C. until complete dissolution of the Ni-rich NMC compound sample. After being cooled to room temperature, the solution and the rinsing water of Erlenmeyer flask are transferred to a 250 mL volumetric flask. Afterwards, the volumetric flask is filled with DI water up to the 250 mL mark, followed by complete homogenization. An appropriate amount of solution is taken out by pipette and transferred into a 250 mL volumetric flask for the $2^{nd}$ dilution, where the volumetric flask is filled with internal standard and 10% hydrochloric acid up to the 250 mL mark and then homogenized. Finally, this solution is used for ICP measurement.

C) Coin Cell Testing

For the preparation of a positive electrode, a slurry that contains a positive electrode active material as described herein, a conductor (Super P, Timcal) and a binder (KF #9305, Kureha)—with a formulation of 90:5:5 by weight—in a solvent (NMP, Mitsubishi) is prepared using a high-speed homogenizer. The homogenized slurry is spread on one side of an aluminum foil using a doctor blade coater with a 230 µm gap. The slurry-coated foil is dried in an oven at 120° C. and then pressed using a calendaring tool. Then it is dried again in a vacuum oven to completely remove the remaining solvent in the electrode film. A coin cell is assembled in an argon-filled glovebox. A separator (Celgard 2320) is located between the positive electrode and a piece of lithium foil used as a negative electrode. 1M LiPF$_6$ in EC/DMC (1:2) is used as electrolyte and is dropped between separator and electrodes. Then, the coin cell is completely sealed to prevent leakage of the electrolyte.

Each cell is cycled at 25° C. using Toscat-3100 computer-controlled galvanostatic cycling stations (from Toyo). The coin cell testing schedule used to evaluate samples is detailed in Table 1. The schedules use a 1C current definition of 160 mA/g and comprise the evaluation of rate performance at 0.1C in the 4.3~3.0V/Li metal window range. The initial charge capacity CQ1 and discharge capacity DQ1 are measured in constant current mode (CC). The first cycle efficiency ($E_F$) is expressed in % as:

$$E_F = \frac{DQ1}{CQ1} \times 100 (\%)$$

TABLE 1

Coin cell testing schedule

| | | Charge | | | | Discharge | | |
|---|---|---|---|---|---|---|---|---|
| Cycle No | C Rate | End current | Rest (min) | V/Li metal (V) | C Rate | End current | Rest (min) | V/Li metal (V) |
| 1 | 0.10 | — | 30 | 4.3 | 0.10 | — | 30 | 3.0 |

D) Full Cell Testing 650 mAh pouch-type cells are prepared as follows: the positive electrode active material powder as described herein, Super-P (Super-P™ Li commercially available from Timcal), and graphite (KS-6 commercially available from Timcal) as positive electrode conductive agents and polyvinylidene fluoride (PVDF 1710 commercially available from Kureha) as a positive electrode binder are added to NMP (N-methyl-2-pyrrolidone) as a dispersion medium so that the mass ratio of the positive electrode active material powder, the positive electrode conductive agent, and the positive electrode binder is set at 92/3/1/4. Thereafter, the mixture is kneaded to prepare a positive electrode mixture slurry. The resulting positive electrode mixture slurry is then applied onto both sides of a positive electrode current collector, made of a 15 µm-thick aluminum foil. The width and the length of the applied area is 43 mm and 450 mm, respectively. Typical positive electrode active material loading weight is 13.9 mg/cm$^2$. The electrode is then dried and calendared using a pressure of 100 Kgf. Typical electrode density is 3.2 g/cm$^3$. In addition, an aluminum plate serving as a positive electrode current collector tab is arc-welded to an end portion of the positive electrode.

Commercially available negative electrodes are used. In short, a mixture of graphite, CMC (carboxy-methyl-cellulose-sodium) and SBR (styrenebutadiene-rubber), in a mass ratio of 96/2/2, is applied on both sides of a copper foil. A Ni plate serving as a negative electrode current collector tab is arc-welded to an end portion of the negative electrode. Typical cathode and anode discharge capacity ratio used for cell balancing is 0.75. Non-aqueous electrolyte is obtained by dissolving lithium hexafluorophosphate (LiPF$_6$) salt at a concentration of 1.0 mol/L in a mixed solvent of EC (ethylene carbonate) and DEC (diethyl carbonate) in a volume ratio of 1:2.

A sheet of the positive electrode, a sheet of the negative electrode, and a sheet of separator made of a 20 µm-thick microporous polymer film (Celgard® 2320 commercially available from Celgard) interposed between them are spirally wound using a winding core rod to obtain a spirally-wound electrode assembly. The wounded electrode assembly and the electrolyte are then put in an aluminum laminated pouch in an air-dry room with dew point of −50° C., so that a flat pouch-type lithium secondary battery is prepared. The design capacity of the secondary battery is 650 mAh when charged to 4.20V.

The non-aqueous electrolyte solution is impregnated for 8 hours at room temperature. The battery is pre-charged at 15% of its theoretical capacity and aged 1 day, also at room temperature. The battery is then degassed for 30 seconds, and the aluminum pouch is sealed. The battery is prepared for use as follows: the battery is charged using a current of 0.2C (with 1C=650 mA) in CC mode (constant current) up to 4.2V then CV mode (constant voltage) until a cut-off current of C/20 is reached, before being discharged in CC mode at 0.5C rate down to a cut-off voltage of 2.7V.

The lithium secondary full cell batteries are charged and discharged several times under the following conditions, both at 25° C. and 45° C., to determine their charge-discharge cycle performance:
- a charge is performed in CC mode under 1C rate up to 4.2V, then CV mode until C/20 is reached,
- the cell is then set to rest for 10 minutes,
- a discharge is performed in CC mode at 1C rate down to 2.7V,
- the cell is again set to rest for 10 minutes, after which charge-discharge cycles proceed until the battery reaches 80% retained capacity. Every 100 cycles, a discharge is performed at 0.2C rate in CC mode down to 2.7 V.

E) Differential Scanning Calorimetry (DSC)

Small coin cell electrodes containing about 3.3 mg of positive electrode active material as described herein are punched and assembled in coin cells. Coin cells are charged to 4.3V using a C/24 charge rate (1C=175 mAh/g) followed by a constant voltage soak for at least an hour. After disassembly of the coin cells electrodes are repeatedly washed in DMC to remove remaining electrolyte. After evaporating the DMC the electrodes are immersed into stainless steel cans and about 1.2 mg of PVDF based electrolyte is added, following by hermetic closing (crimping) of the cells. The DSC measurement is performed using a TA instrument DSC Q10 device. The DSC scan is performed from 50° C. to 350° C. using a heat rate of 5K/min. DSC cells and crimping equipment were also supplied by TA.

F) Cross-Section Energy-Dispersive X-Ray Spectroscopy (CS-EDS)

F1) Cross-Section Preparation

Cross-sections of positive electrode active materials as described herein are prepared by an ion beam cross-section polisher (CP) instrument JEOL (IB-0920CP). The instrument uses argon gas as beam source.

To prepare the specimen, a small amount of a positive electrode active material powder is mixed with a resin and hardener, then the mixture is heated for 10 minutes on a hot plate. After heating, it is placed into the ion beam instrument for cutting and the settings are adjusted in a standard procedure, with a voltage of 6.5 kV for a 3 hours duration.

F2) EDS Analysis

Using the samples of the positive electrode active materials prepared in method F1) above, the concentration of Ni, Mn, and Co from the edge to the center of the positive electrode material secondary particles is analyzed by energy-dispersive X-ray spectroscopy (EDS). Secondary particle with a diameter around D50 value as measured by PSD according to Section A) is selected for analysis. The EDS is performed by JEOL JSM 7100F SEM equipment with a 50 mm$^2$ X-MaxN EDS sensor from Oxford instruments. An EDS analysis of the positive electrode active material secondary particles provides the quantitative element analysis of the cross-section wherein it is assumed that particles are spherical. A straight line is set from the edge to the center point of the secondary particle and multiples points are set along the line with about 0.4 μm distance between each point. Ni, Mn, and Co concentrations are measured at every point and expressed as a molar fraction compared to the sum of Ni, Mn, and Co content at each point.

G) X-Ray Powder Diffraction (XRD)

G1) XRD Measurement

The X-ray diffraction pattern of the positive electrode active material powder is collected with a Rigaku X-Ray Diffractometer D/max2000 using a Cu Kα radiation source (40 kV, 40 mA) emitting at a wavelength of 1.5418 Å. The instrument configuration is set at: a 1° Soller slit (SS), a 10 mm divergent height limiting slit (DHLS), a 1° divergence slit (DS) and a 0.3 mm reception slit (RS). The diameter of the goniometer is 185 mm. For the XRD, diffraction patterns are obtained in the range of 15-85° (2θ) with a scan speed of 1° per min and a step-size of 0.02° per scan.

G2) Crystallite Size Calculation

The average crystallite size is determined by the XRD measurement of the positive electrode active material secondary particles. It has a good correlation with an average primary particle size of the positive electrode active material secondary particles. Therefore, the average crystallite size obtained by XRD is often used as a relative parameter to estimate the primary particle size of the secondary particles.

The average crystallite size of the secondary particles of the positive electrode active material is determined according to the following steps:

Step 1) Collecting diffractogram of standard LaB$_6$ material (99.5%, Alfa Aesar, https://www.fishersci.fi/shop/products/lanthanum-boride-99-5-reo/11373888) according to the XRD measurement described in G1.

Step 2) Performing fitting to the collected LaB$_6$ diffractogram from Step 1) for peak at 2θ of 47° to 51° in Origin 2018b Version b9.5.5.409. Two peaks are fitted using Voigt line shape to separate Kα1 and Kα2 contributions wherein the integrated peak ratio of Kα1 and Kα2 is around 2:1. FWHM (full width at half maximum) of Kα1 peak in the 2θ range of 47° to 51° is obtained from the fitting result.

Step 3) Collecting diffractogram of the positive electrode active material according to the XRD measurement described in G1.

Step 4) Performing fitting to the collected positive electrode active material diffractogram from Step 3) for a single peak at 2θ of 42° to 47° in Origin 2018b Version b9.5.5.409 using Voigt line shape. FWHM and peak position of the peak in the 2θ range of 42° to 47° is obtained from the fitting result.

Step 5) Calculating the average crystallite size of the secondary particles of the positive electrode active material by using a Scherrer equation:

$$\tau = \frac{K \cdot \lambda}{\beta \cdot \cos\theta},$$

wherein τ is the average crystallite size in nm as calculated from XRD, λ is the X-Ray wavelength in nm, K is the Scherrer constant which set as 0.9, β is the FWHM of positive electrode active material in radians as obtained from Step 4 subtracted by FWHM of LaB$_6$ in radians as obtained in Step 2, and θ is XRD peak position of positive electrode active material in radians as obtained from Step 4.

The present invention is further illustrated in the following examples:

EXAMPLES

Examples EX1-P1, EX1-P2, EX1-P3 and Comparative Example CEX1-P4

Examples EX1-P1, EX1-P2 and EX1-P3 of positive electrode active materials according to the present invention and comparative example CEX1-P4 of a positive electrode active material were prepared as follows. The precipitation processes are performed in a reactor with a liquid volume of 10 L using an overflow tube and an impeller motor of 400 W. The impeller of 10 cm diameter was stirred at 800 RPM. The reactor had 4 baffles to allow vigorous stirring. A flow of 50 L/h of nitrogen gas was applied above the liquid level to avoid oxidation due to the vigorous stirring. Three solutions containing nickel, manganese, and cobalt sulfate (NiSO$_4$, MnSO$_4$, CoSO$_4$) with a total concentration of 110 g/L metal were prepared to yield a mixed MeSO$_4$ solution, wherein Me consists of Ni, Mn, and Co. The first solution had a Ni:Mn:Co molar ratio of 0.8:0.1:0.1, and the second solution had a molar ratio of 0.0:0.1:0.9. A solution of 400 g/L NaOH and an undiluted ammonia solution of 25% were used.

All precursors used for preparing EX1-P1, EX1-P2, EX1-P3 and CEX1-P4 had a formula Ni$_{0.74}$Mn$_{0.09}$Co$_{0.17}$O$_{0.27}$(OH)$_{1.73}$ which were prepared in a multiple step process:

S1-Seed Preparation:

A Ni$_{0.8}$Mn$_{0.1}$Co$_{0.1}$(OH)$_2$ seed precursors used for preparing EX1-P1, EX1-P2, EX1-P3 and CEX1-P4 were prepared using a typical co-precipitation in a Continuous Stirred Tank Reactor (CSTR), having a specific residence time of 6 hours. At the start the reactor was filled with water and ammonia to get a 15 g/L of ammonia solution inside. The temperature in the reactor was 60° C. After the reactor was filled with the starting solution, the different reagents (MeSO$_4$ solution, NaOH solution, NH$_3$ solution) were pumped simultaneously in the reactor at different injection points, keeping the ammonia to metal ratio of 1:1 and keeping the pH around 11.7. There should be more than 2 OH$^-$ ions for each metal ion in the solution during the precipitation reaction. After 24 hours, the reactor was in steady state and the D50 is between 5 and 20 μm, and the slurry from the overflow was collected. The precipitated metal hydroxides were washed, filtered under a protective atmosphere to remove the dissolved salts and ammonia. 200 g of the wet cake was re-pulped in 1 L water and treated with a mechanical pulverization by ball mill. This treatment reduced the D50 size to less than 2 μm.

S2-Precipitation of the Core Particles:

A $Ni_{0.8}Mn_{0.1}Co_{0.1}(OH)_2$ core precursors of EX1-P1, EX1-P2, EX1-P3 and CEX1-P4 were prepared using a modified co-precipitation in a Continuous Stirred Tank Reactor (CSTR), having a specific or average residence time of 3 hours. The 8:1:1 $MeSO_4$ first solution compositions were used. At the start the reactor was filled with water and ammonia to get a 15 g/L of ammonia solution inside. The temperature in the reactor was 60° C. After the reactor was filled with the starting solution, different reagents ($MeSO_4$ solution, NaOH solution, $NH_3$ solution) were pumped simultaneously in the reactor at different injection points, keeping the ammonia to metal ratio of 1:1 and keeping the pH around 11.7 with the NaOH solution. Typically, there should be more than 2 $OH^-$ ions for each metal ion in the solution. After 6 hours, 100 g of seeds from S1 were added to the reactor. The (particle size) span in the reactor immediately became large and the D50 became small. After at least 6 hours the span decreased steadily to a value below 0.9. At this point the particles have grown to around 6-11 μm. The slurry in the overflow was now collected in a beaker of 3 L and the particles were allowed to settle in the beaker. The beaker was decanted each 30 minutes, and the slurry was put back into the reactor. The dosing of the reagents was stopped when the particles reach a sufficient size (around 11 μm).

S3-Precipitation of the Shell:

The metal sulfate solution ($MeSO_4$) dosed to the reactor in S2 was switched to the second $MeSO_4$ (this time with Me=$Mn_{0.1}Co_{0.9}$) solution. The dosing of all chemicals was re-started, and the overflow was collected in a 3 L beaker. Every 30 min the beaker was decanted to remove filtrate and the slurry was put back into the reactor. This practice was continued until the shell with the desired thickness was grown using this procedure. The precipitated metal (oxy-)hydroxides were washed and filtered under protective atmosphere to remove the dissolved salts and ammonia. The wet cake was dried in a furnace at 150° C. under nitrogen. The final core-shell precipitated metal (oxy-)hydroxide precursors used for preparing EX1-P1, EX1-P2, EX1-P3 and CEX1-P4 had a Ni:Mn:Co core composition of 80:10:10 and a Ni:Mn:Co shell composition of 0:10:90. The average metal composition of these first precursors as determined ICP analysis was Ni:Mn:Co=73.8:9.5:16.7 (in mol %). Important factors like pH, stirring rate, chemical concentration, and temperature were delicately controlled during precipitation process to maintain a constant final product composition. The thickness of the shell could be calculated based on the process conditions, but also measured afterwards using advanced analysis instruments such as XPS depth profiling or even TEM.

Preparation of Positive Electrode Active Materials

EX1-P1, EX1-P2, EX1-P3 and CEX1-P4 positive electrode active materials were obtained by blending the first precursors with a lithium source followed by sintering at a temperature varying from 700° C. to 820° C. LiOH was selected as lithium source and the blending was designed to have a Li to metal mol ratio (Li/M') of 1.00. 30 g of this blend was sintered in a crucible at four different temperatures (700° C., 740° C., 780° C., and 820° C.), which were respectively used for EX1-P1, EX1-P2, EX1-P3 and CEX1-P4. The sintering at the target temperature was performed under an oxygen atmosphere for 12 hours. The sintered agglomerated compounds were crushed and sieved. The composition of Ni, Mn, and Co in EX1-P1, EX1-P2, EX1-P3, and CEX1-P4 of Ni:Mn:Co=73.8:9.5:16.7 (in mol %) was maintained from first precursor composition, as determined by ICP. Table 2 below shows the electrochemical performance of the positive electrode active materials of EX1-P1, EX1-P2, EX1-P3, and CEX1-P4 as determined according to the above described coin cell test in Section C).

TABLE 2

Electrochemical properties of positive electrode active materials EX1-P1, EX1-P2, EX1-P3, and CEX1-P4

| Sample ID | Sintering temperature (° C.) | XRD Average crystallite size (nm) | Coin cell CQ1 (mAh/g) | Coin cell DQ1 (mAh/g) | $E_F$ (%) |
|---|---|---|---|---|---|
| EX1-P1 | 700 | 27 | 208.8 | 196.7 | 94.2 |
| EX1-P2 | 740 | 36 | 211.2 | 197.1 | 93.3 |
| EX1-P3 | 780 | 50 | 214.0 | 201.3 | 94.1 |
| CEX1-P4 | 820 | 67 | 213.9 | 194.8 | 91.1 |

In this Table 2, it was demonstrated that a positive electrode active material according to the present invention which was made from a suitable precursor and sintered at a temperature of from about 680° C. to less than about 800° C. had the highest $E_F$ values. The benefit in the lower $E_F$ values was also linked with the average crystallite size of the secondary particles being lower than 65 nm, as calculated by XRD method in the Section G). A sintering temperature higher than 800° C. typically promoted the growth of the average crystallite size of the secondary particles exceeding 65 nm, as shown in Table 2 above for CEX1-P4.

In particular, the results provided in Table 2 above show that an improved first cycle efficiency ($E_F$) of above about 92% can be achieved with a battery using a positive electrode active material powder according to EX1-P1, EX1-P2, or EX1-P3 and having a crystallite size less than 65 nm. The values of $E_F$ measured for the positive electrode active materials EX1-P1, EX1-P2, or EX1-P3 are superior to that of the comparative positive electrode active material of CEX1-P4 ($E_F$ of 91%) having a crystallite size of 67 nm and of CEX2-P3 ($E_F$ of 90%) having no Ni and Co concentration variation in the direction from edge part to the center part of the secondary particle.

Comparative Examples CEX2-P1, CEX2-P2, CEX2-P3, and CEX2-P4 Comparative Examples CEX2-P1, CEX2-P2, CEX2-P3, and CEX2-P4 were prepared as follows. A second precursor having the formula $Ni_{0.8}Mn_{0.1}Co_{0.1}O_{0.25}(OH)_{1.75}$ used for preparing CEX2-P1, CEX2-P2, CEX2-P3, and CEX2-P4 was prepared by the same procedure as described above for the first precursor, except that the precipitation of the shell in the S3 step was skipped. The average metal composition of the second precursor is Ni:Mn:Co=79.8:9.8:10.4 (in mol %). The positive electrode active materials CEX2-P1, CEX2-P2, CEX2-P3, and CEX2-P4 were prepared by the same procedure as EX1-P1, EX1-P2, EX1-P3, and CEX1-P4, respectively, except that second precursor is used as the metal bearing compound instead of the first precursor. Composition of Ni, Mn, and Co in the lithiated product CEX2-P1, CEX2-P2, CEX2-P3, and CEX2-P4 of Ni:Mn:Co=79.8:9.8:10.4 (in mol %) was maintained from second precursor composition as determined by ICP. Table 3 shows the electrochemical performance of the positive electrode active materials as determined in the above-described coin cell test described in section C).

TABLE 3

Electrochemical properties of positive electrode active materials Comparative Examples CEX2-P1, CEX2-P2, CEX2-P3, and CEX2-P4

| Sample ID | Sintering temperature (° C.) | XRD Average crystallite size (nm) | Coin cell CQ1 (mAh/g) | DQ1 (mAh/g) | $E_F$ (%) |
|---|---|---|---|---|---|
| CEX2-P1 | 700 | 30 | 216.3 | 196.1 | 90.7 |
| CEX2-P2 | 740 | 38 | 221.1 | 200.4 | 90.6 |
| CEX2-P3 | 780 | 60 | 223.5 | 200.6 | 89.8 |
| CEX2-P4 | 820 | 81 | 225.7 | 200.8 | 89.0 |

FIG. 1 shows the first cycle efficiency ($E_F$) of positive electrode active materials prepared by different metal bearing compounds. The positive electrode active materials prepared by first precursor generally had a higher $E_F$ value than the positive electrode active materials prepared from the second precursor at the corresponding sintering temperature. Among each example and comparative examples groups, the CEX1-P4 and CEX2-P4, which were the precursors sintered at 820° C. and showed the lowest $E_F$ value. This conclude that the positive electrode active material having an average crystallite size of lower than 65 nm can achieve the target of this invention, which is to provide a positive electrode active material having initial discharge capacity (DQ1) higher than 195 mAh/g and first cycle efficiency ($E_F$) higher than 91%.

Figure 2:
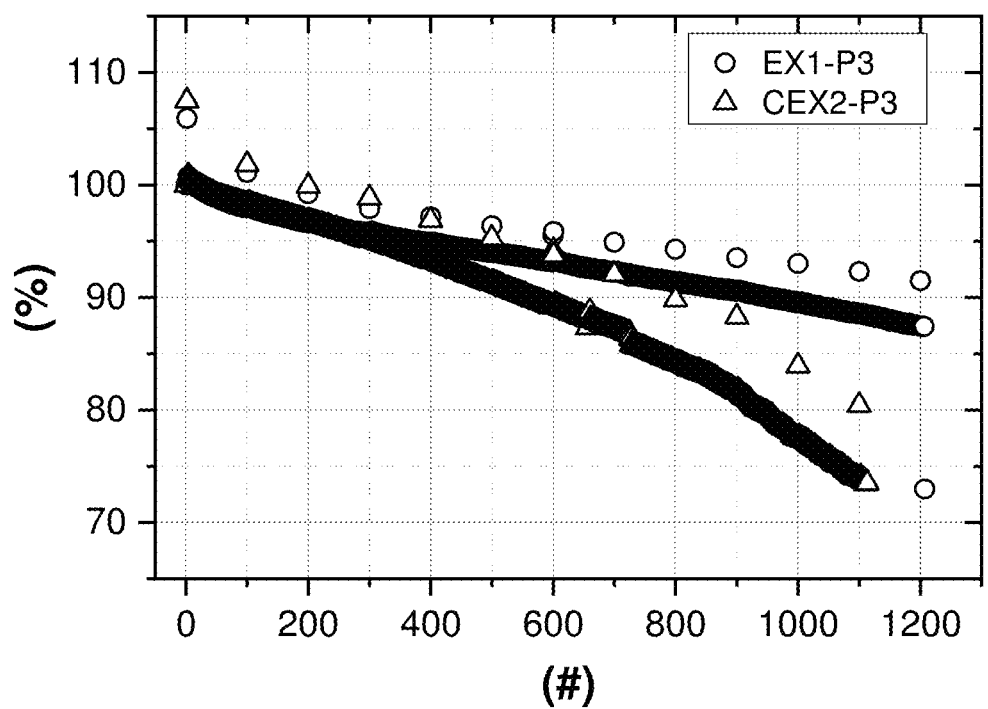
FIG. 2. Comparison of full cell cycle performance of EX1-P3 and CEX2-P3 at 25° C. (x-axis: number of cycles, y-axis: capacity in %)
Figure 3:
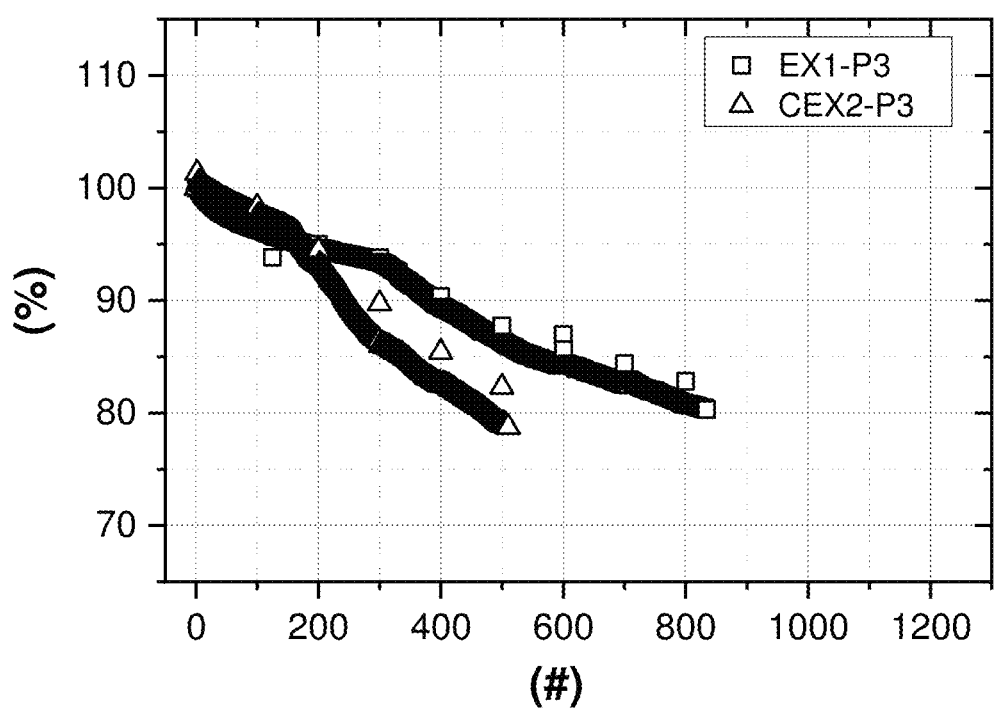
FIG. 3. Comparison of full cell cycle performance of EX1-P3 and CEX2-P3 at 45° C. (x-axis: number cycles, y-axis: capacity in %)

FIGS. 2 and 3 show the full cell cycle performance of EX1-P3 and CEX2-P3 at 25° C. and 45° C. respectively, as described in section D). The cycle life is defined as the number of charge-discharge cycles before the capacity degrades to or below 80%. The value of cycle life can be extrapolated through a linear line equation and is shown in Table 4. It is clear that EX1-P3 had a smaller gradient and reached 80% of capacity after 1913 cycles at 25° C. The number was halved for CEX3-P3 to around 921 cycles. The same tendency was observed for both measurement temperatures. The result clearly shows a better cyclability of EX1-P3 compared to the CEX2-P3.

TABLE 4

Calculated cycle life of EX1-P3 and CEX2-P3

| Sample ID | Number of cycles at 80% of capacity | |
|---|---|---|
| | 25° C. | 45° C. |
| EX1-P3 | 1913 | 967 |
| CEX2-P3 | 921 | 440 |

Figure 4:
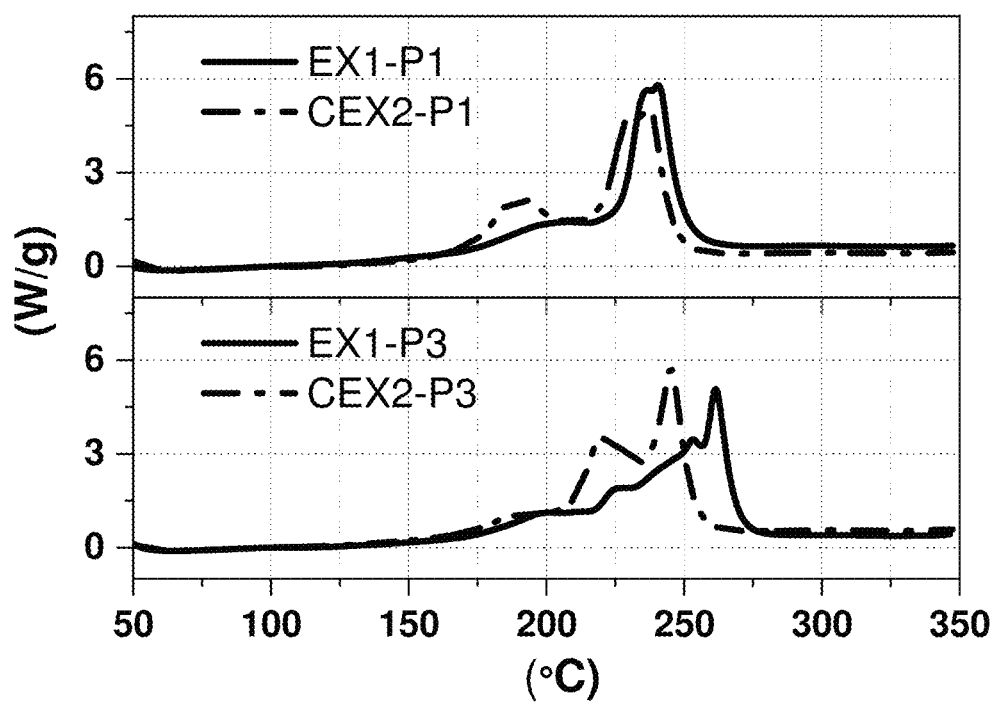
FIG. 4. Differential scanning calorimetry (DSC) data of EX1-P1 and CEX3-P1 (top), and EX1-P3 and CEX3-P3 (bottom) (x-axis: temperature in ° C., y-axis: heat flow in W/g)

FIG. 4 shows the DSC analysis of the charged positive electrodes prepared with EX1-P1, CEX2-P1, EX1-P3 and CEX2-P3, as determined by the method described in section E). The highest exothermic peak in each graph indicates the thermal decomposition of the positive electrode active material, which is preferable to occur at a higher temperature. Thermal decomposition of EX1-P3 occurred at around 260° C., shifted about 15° C. from CEX2-P3 decomposition temperature (245° C.). The same tendency was observed for EX1-P1 and CEX2-P1.

Figure 5:
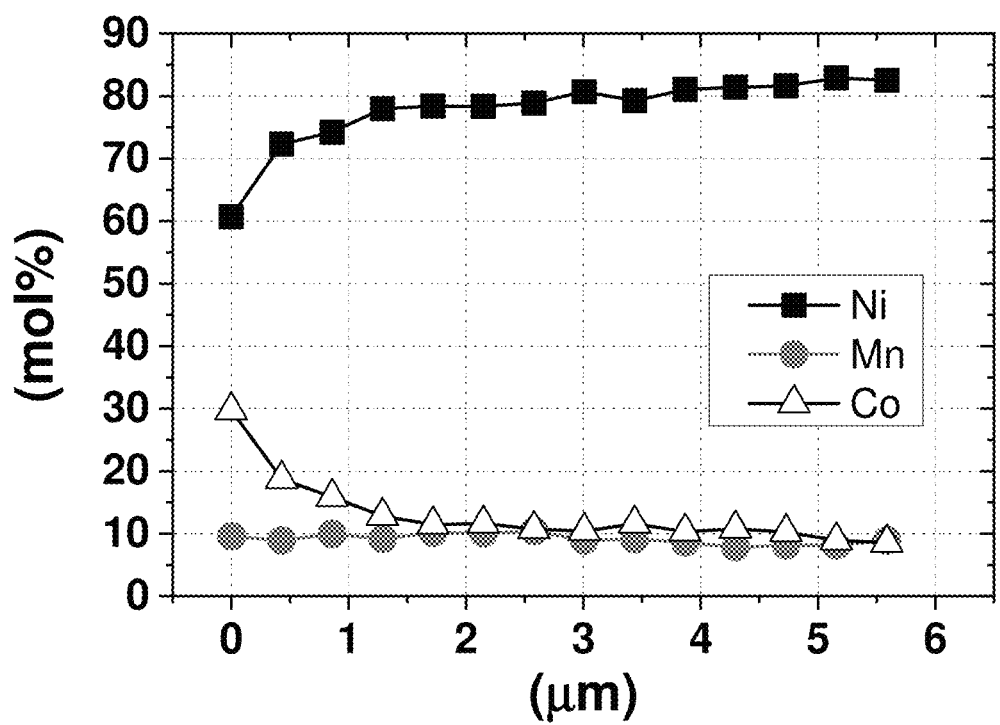
FIG. 5. Cross-sectional EDS (CS-EDS) scan of EX1-P1 showing concentration gradients of Ni and Co from the edge to center part of the secondary particle (x-axis: distance from the edge in μm, y-axis: concentration of element in mol % relative to the total molar concentration of Ni, Mn, and Co)
Figure 6:
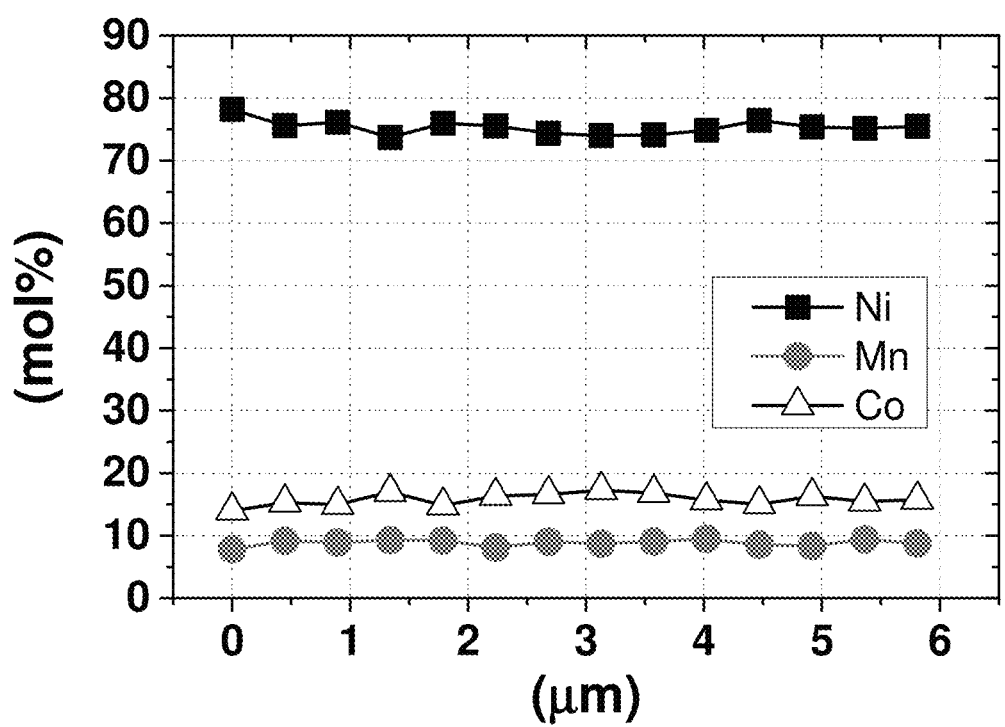
FIG. 6. Cross-sectional EDS (CS-EDS) scan of CEX1-P4 showing no concentration gradients of Ni and Co from the edge to center part of the secondary particle (x-axis: distance from the edge in μm, y-axis: concentration of element in mol % relative to the total molar concentration of Ni, Mn, and Co)
Figure 7:
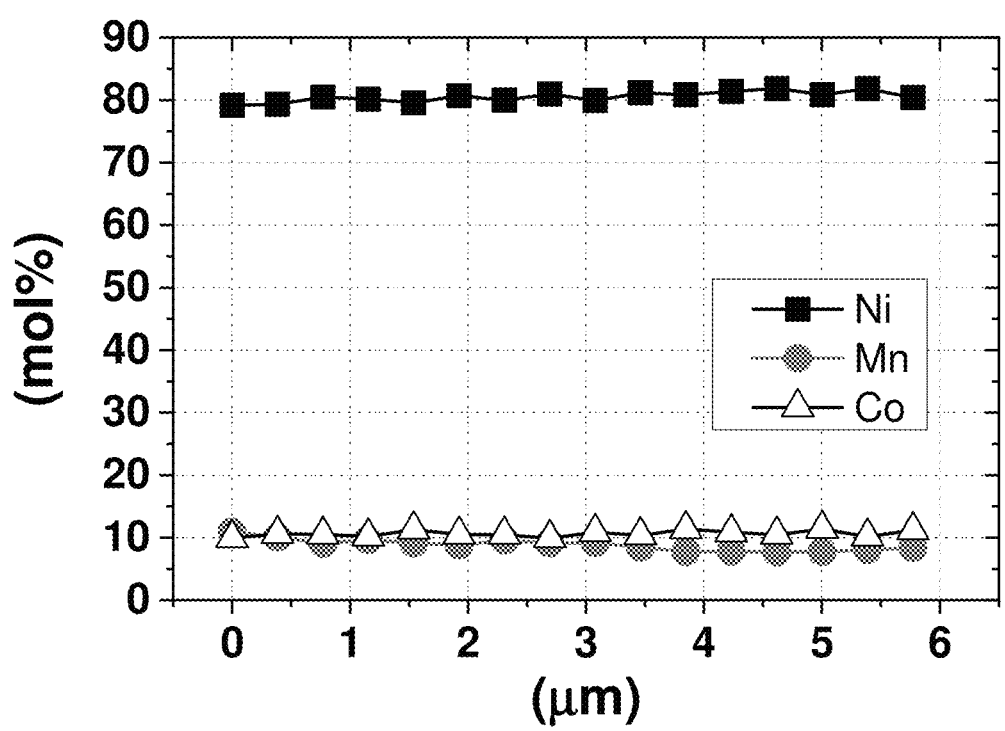
FIG. 7. Cross-sectional EDS (CS-EDS) scan of CEX2-P3 showing no concentration gradients of Ni and Co from the edge to center part of the secondary particle (x-axis: distance from the edge in μm, y-axis: concentration of element in mol % relative to the total molar concentration of Ni, Mn, and Co)

FIGS. 5 to 7 show the CS-EDS analysis as described in section F) for EX1-P1, CEX1-P4, and CEX2-P3, respectively. The molar fraction of Ni, Mn, and Co each at the edge of particle and at the center of particle is displayed in Table 5. EX1-P1 which was manufactured at 700° C. showed Ni and Co gradients from the surface to the center of the positive electrode active material particle. Ni and Co concentration gradients were observed from the edge (at 0 μm) to the center of EX1-P1 wherein Ni concentration at the edge was lower than the center. Conversely, Co concentration at the edge of EX1-P1 was higher than the concentration in the center following the composition of the first precursor. On the other hand, both Ni and Co concentration gradients were not observed in CEX1-P4 which was prepared at a higher sintering temperature of 820° C. indicating that the core-shell precursor characteristic disappeared when the sintering temperature was higher than 800° C. CEX2-P3 manufactured from precursor with no core-shell characteristic showed no Ni and Co concentration gradient as well.

TABLE 5

Element concentration as measured by CS-EDX

| | Molar fraction at the edge of particle | | | Molar fraction at the center of particle | | |
|---|---|---|---|---|---|---|
| ID | $Ni_{edge}$ (mol %) | $Mn_{edge}$ (mol %) | $Co_{edge}$ (mol %) | $Ni_{center}$ (mol %) | $Mn_{center}$ (mol %) | $Co_{center}$ (mol %) |
| EX1-P1 | 60.7 | 9.6 | 29.7 | 82.5 | 8.9 | 8.6 |
| CEX1-P4 | 78.2 | 7.8 | 14.0 | 75.5 | 15.7 | 8.8 |
| CEX2-P3 | 79.2 | 10.9 | 9.9 | 80.4 | 11.2 | 8.4 |

The invention claimed is:
1. A positive electrode active material suitable for lithium-ion rechargeable batteries, said positive electrode active material comprising Li, M', and oxygen, wherein M' comprises:
Ni in a content x, wherein 70.0 mol %≤x≤75.0 mol %, relative to M';
Co in a content y, wherein 0.1 mol %≤y≤40.0 mol %, relative to M';
Mn in a content z, wherein 0.1 mol %≤z≤70.0 mol %, relative to M',
D in a content a, wherein 0.0 mol %≤a≤2.0 mol %, relative to M', wherein D comprises at least one element of the group consisting of: Al, B, Ba, Ca, Cr, Fe, Mg, Mo, Nb, S, Si, Sr, Ti, Y, V, W, Zn, and Zr, and
wherein x, y, z, and a contents are measured by ICP, and x+y+z+a is 100.0 mol %,
wherein said positive electrode active material comprises secondary particles comprising a plurality of primary particles, and
wherein the positive electrode active material has a Ni content $Ni_{edge}$ and Co content $Co_{edge}$ as measured by cross-sectional EDS (CS-EDS) at an edge of the secondary particle of the positive electrode active material, wherein $Ni_{edge}$ and $Co_{edge}$ contents are expressed as molar fractions compared to the sum of Ni, Mn, and Co content as measured by CS-EDS at the edge of the secondary particle of the positive electrode active material,
wherein the positive electrode active material has a Ni content $Ni_{center}$ and Co content $Co_{center}$ measured by CS-EDS at the center of the secondary particle of the positive electrode active material, wherein $Ni_{center}$ and $Co_{center}$ contents are expressed as molar fractions compared to the sum of Ni, Mn, and Co content as measured by CS-EDS at the center of the secondary particle of the positive electrode active material,
wherein the ratio $Ni_{edge}/Ni_{center}<1.0$
wherein the ratio $Co_{edge}/Co_{center}>1.0$ wherein said secondary particles have an average crystallite size of at most 65 nm, as determined by XRD.

2. The positive electrode active material according to claim 1, wherein $Ni_{edge}/Ni_{center}<0.95$ and $Co_{edge}/Co_{center}>1.05$.

3. The positive electrode active material according to claim 1, wherein the difference between $Ni_{edge}$ and $Ni_{center}$ is at least 5 mol % and the difference between $Co_{edge}$ and $Co_{center}$ is at least 5 mol %, as determined by CS EDS analysis.

4. The positive electrode active material according to claim 1, wherein Mn molar fraction at the edge of positive electrode active material compared to the sum of Ni, Mn, and Co content as measured by CS-EDS at the edge of positive electrode active material is higher than 0 mol %.

5. The positive electrode active material according to claim 1 wherein the secondary particles have an average crystallite size is at least 15 nm and at most 65 nm, as determined by XRD.

6. A battery comprising the positive electrode active material according claim 1.

7. Use of a battery according to claim 6 in a portable computer, a tablet, a mobile phone, an electrically powered vehicle, or an energy storage system.

* * * * *